(12) United States Patent
Distante et al.

(10) Patent No.: US 8,543,525 B2
(45) Date of Patent: Sep. 24, 2013

(54) METHOD AND SYSTEM FOR THE AUTOMATIC DETECTION OF EVENTS IN SPORT FIELDS

(75) Inventors: Arcangelo Distante, Bari (IT); Ettore Stella, Bari (IT); Massimiliano Nitti, Bari (IT); Liborio Capozzo, Bari (IT); Tiziana Rita D'Orazio, Bari (IT); Massimo Ianigro, Bari (IT); Nicola Mosca, Bari (IT); Marco Leo, Bari (IT); Paolo Spagnolo, Bari (IT); Pier Luigi Mazzeo, Bari (IT)

(73) Assignee: Consiglio Nazionale Delle Richerche (CNR), Rome (IT)

( * ) Notice: Subject to any disclaimer, the term of this patent is extended or adjusted under 35 U.S.C. 154(b) by 1326 days.

(21) Appl. No.: 12/280,152

(22) PCT Filed: Feb. 28, 2007

(86) PCT No.: PCT/IB2007/050652
§ 371 (c)(1),
(2), (4) Date: Oct. 9, 2008

(87) PCT Pub. No.: WO2007/099502
PCT Pub. Date: Sep. 7, 2007

(65) Prior Publication Data
US 2009/0074246 A1     Mar. 19, 2009

(30) Foreign Application Priority Data
Mar. 3, 2006   (IT) .............................. RM2006A0110

(51) Int. Cl.
*G06F 15/18*   (2006.01)
*G06K 9/00*    (2006.01)

(52) U.S. Cl.
CPC .................................. *G06K 9/00724* (2013.01)
USPC .............................. 706/20; 382/156; 382/107

(58) Field of Classification Search
USPC ......... 382/103, 106, 107, 155–161, 164–165, 382/168–172, 173–231
See application file for complete search history.

(56) References Cited

U.S. PATENT DOCUMENTS
2005/0078095 A1 * 4/2005 Ung et al. ...................... 345/175

FOREIGN PATENT DOCUMENTS
EP         1291042         3/2003

OTHER PUBLICATIONS

Kim, Changick et al.; "Fast and Automatic Video Object Segmentation and Tracking for Content-Based Applications"; 2002; IEEE; Transactions on Circuits and Systems for Video Technology, vol. 12, No. 2; pp. 122-129.*
Dedeoglu, Yigithan; "Moving Object Detection, Tracking and Classification for Smart Video Surveillance"; 2004; Institute of Engineering and Science of Bilkent University (Thesis); pp. 1-85.*
Garibotto, Giovanni et al.; "3D Scene Analysis by Real-Time Stereovision"; 2005; IEEE; 4 pages.*

(Continued)

*Primary Examiner* — Jeffrey A Gaffin
*Assistant Examiner* — Stanley K Hill
(74) *Attorney, Agent, or Firm* — Steinfl & Bruno LLP

(57) ABSTRACT

The present invention refers to the problem of the automatic detection of events in sport field, in particular Goal/NoGoal events by signalling to the mach management, which can autonomously take the final decision upon the event. The system is not invasive for the field structures, neither it requires to interrupt the game or to modify the rules thereof, but it only aims at detecting objectively the event occurrence and at providing support in the referees' decisions by means of specific signalling of the detected events.

38 Claims, 11 Drawing Sheets

(56) References Cited

OTHER PUBLICATIONS

Remondino, Fabio et al.; "Digital Camera Calibration Methods: Considerations and Comparisons"; 2006; ISPRS Commission V Symposium 'Image Engineering and Vision Metrology'; pp. 266-272.*
D'Orazio, T. et al.; "A new algorithm for ball recognition using circle Hough transform and nerual classifier"; 2004; Pattern Recognition 37 (2004); pp. 393-408.*
Hashimoto, Sadatsugu et al.; "A System for Automatic Judgement of Offsides in Soccer Games"; 2006; IEEE; pp. 1889-1892.*
Naidoo, Wayne Chelliah et al.; "Soccer Video Analysis by Ball, Player and Referee Tracking"; 2006; SAICSIT; pp. 51-60.*
Lipton, Alan J. et al.; "Moving Target Classification and Tracking from Real-Time Video"; 1998; IEEE; pp. 8-14.*
PCT International Search Report for PCT/IB2007/050652 filed Feb. 28, 2007 in the name of Consiglio Nazionale delle Richerche.(CNR).
PCT Written Opinion for PCT/IB2007/050652 filed Feb. 28, 2007 in the name of Consiglio Nazionale delle Richerche.(CNR).

* cited by examiner a) Maschera del vettore kernel per l'asse x b) Maschera del vettore kernel per l'asse x 20 cm

METHOD AND SYSTEM FOR THE AUTOMATIC DETECTION OF EVENTS IN SPORT FIELDS

CROSS REFERENCE TO RELATED APPLICATIONS

The present application is the US national stage of International Application PCT/IB2007/050652 filed on Feb. 28, 2007 which, in turn, claims priority to Italian application RM2006A000110 filed on Mar. 3, 2006.

The present invention aims at solving the problem of the automatic detection of Goal/NoGoal events by signalling to the match management, which can autonomously take the final decision upon the event.

Such problem is solved by implementing a method like the one substantially described in claim 1, as well as by means of a system like the one substantially described in claim 26.

In particular, the method according to the present invention is implemented by means of one or more programmes for computer, stored onto one or more storage means, as defined in claims 34 and 35.

The system is not invasive for the field structures, neither it requires to interrupt the game or to modify the rules thereof, but it only aims at detecting objectively the event occurrence and at providing support in the referees' decisions by means of specific signalling of the detected events (radio and/or image acoustic signalling).

In order to solve this specific case a paradigm is used, falling within the general problem of estimating the space position and the related dynamics of a moving object (a ball, by way of example and not for limitative purposes) with respect to one or more fixed references (posts, transoms, horizontal white line, by way of example and not for limitative purposes), without modifying either the object or the environment wherein it moves (not invasive solution).

In order to comply with such not-invasiveness bond, a tele-detection approach (remote detection without physical contact) has been implemented by means of four intelligent acquisition units which comprise the hardware and software components for the acquisition, recording, display and processing of images in real time.

Said acquisition units, hereinafter also designated as "vision machines" or "nodes" of the system, further comprise digital cameras (passive sensors) in the visible and high time resolution near infrared (200 images/sec).

DETAILED DESCRIPTION OF THE FIGURE

Figure 1:
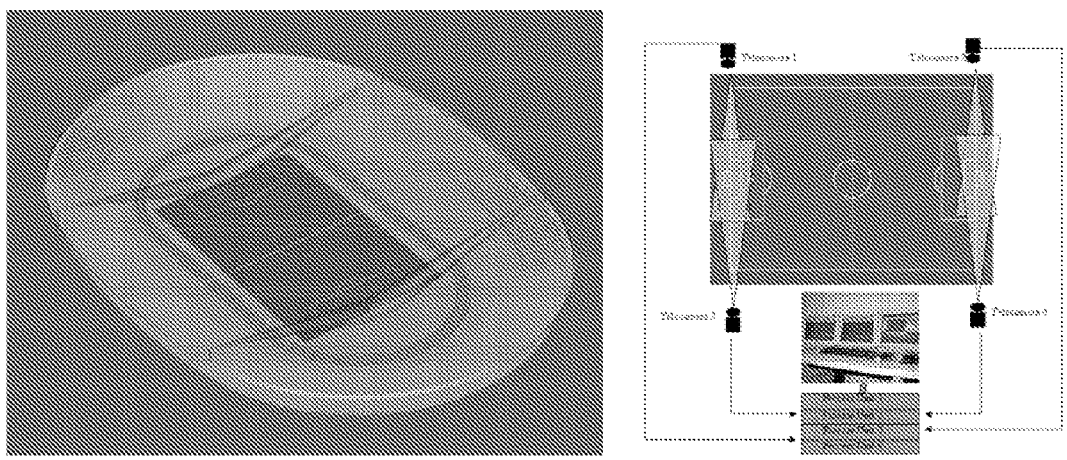
FIG. 1 shows an overall view of the system implementing the method subject of the present invention.

FIG. 1 shows how the cameras are positioned in the stadium, two thereof at the opposed sides of each goal with the optical axes coplanar with the goal's inner plane and converging towards the central point of the goal line. Such cameras' asset allows evaluating if the ball has wholly crossed the goal's inner plane and, thus, to verify if a Goal event has really occurred.

Each vision machine avails of a (PC based) server as properly configured base processing unit with memory to include two hours of digital recording (regular game, extra times and penalty kicks), and double processor specialized in processing in real time image sequences with high frame rate (200 frame/sec, 8 times faster than the standard cameras). In each server different software components operate:

for the acquisition and digital storage of the images;
  for the automatic detection of the phantom goal event (algorithms for recognizing and tracking the ball, as it will be better described hereinafter);
  for the remote control of cameras and the calibration thereof (Pan, Tilt, Zoom, Iris).

The vision machines are all connected in local network (protected network) and they communicate in broadcast with a console of the (PC based) system, also designated as "supervisor", which plays the following functions:

man-machine multimedial interface, that is it sets the operating modes of the vision machine;
  it processes the information produced by each couple of vision machines and it evaluates the occurrence of said goal event (goal detection);
  it signals the occurrence of the Goal/NoGoal event to the umpire and/or to the assistants based upon the FIFA-FIGC decisions.

The connecting means between digital Cameras and related Servers are implemented by wiring copper-optical fibre wires integrated in the stadium's infrastructures properly assembled to protect data.

Figure 2:
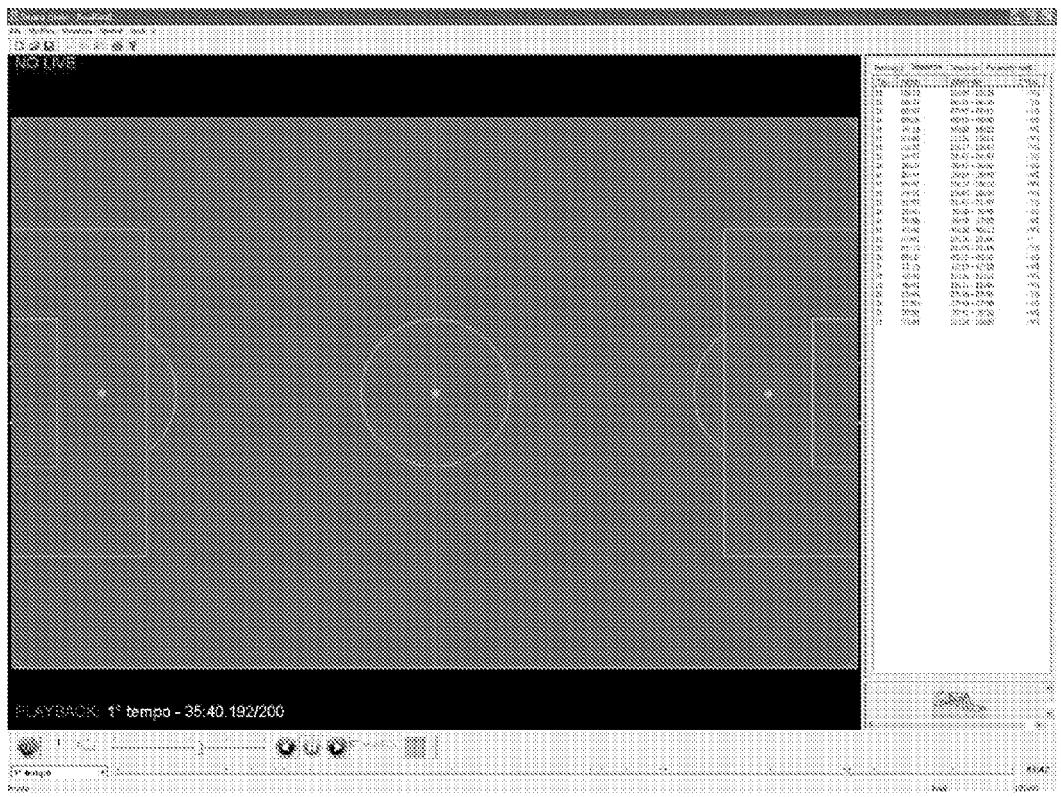
FIG. 2 shows a detail of the system subject of the present invention.

By referring to FIG. 2, the whole system is handled by means of a man-machine interface therewith the system is started and it can operate in two modes: on-line (Live State) or off-line (Playback State).

In the Live State each couple of vision machines acquires continuously and in autonomous and independent way a plurality of digital images in sequence by defining inside thereof a region of initial search and for each one of said acquired images it recognizes all motion subjects, it extracts a filtered image (Background Subtraction) containing exclusively the subjects recognized as moving, it selects in said region for searching said filtered image the subjects recognized as moving and those belonging to a predefined typology (the ball as not limitative example), it calculates the space position of said subjects in said search region; therefore, as soon as the ball enters the camera's field of sight, it is recognized and localized by a Ball Detection process (intelligent software component) and a ball tracking process is triggered (Ball Tracking) by means thereof the ball position inside the image plane is determined frame after frame. The data are subsequently sent to the supervisor which evaluates the occurrence of said event by integrating the information (Data Fusion) coming from each couple of vision machines and it signals such occurrence to the user for the Goal/noGoal decision (Decision Making). When for an image such occurrence is not verified, each couple of vision machines calculates in said region for searching said image, therefor the occurrence has not taken place, one or more parameters identifying the ball dynamics in order to evaluate, based upon said parameters, a new search region to be used for selecting a subsequent image.

The system reactivity depends upon the complexity of the observed scene (number of players in the cameras' field of sight and partial visibility of the ball). Under normal conditions (isolated ball and presence of some players) the goal event signalling occurs in 50 milliseconds (practically in real time), whereas in the complex scenes (presence of several players with ball tracking interrupted from time to time as obstructed) the requested time can be longer until reaching 1000 milliseconds. The real-time functional features are implemented by means of the pre-processing of the image sequences, carried out before the Ball Detection process, which consists in filtering the background (the field of play) that is the scene static elements by automatically extracting the image areas corresponding to the scene moving subjects (ball, players and referee). This activity is implemented by a process called Background Subtraction. In the system start phase a background image for each vision machine is calculated automatically and in the Live state such image is updated automatically (by means of a Background Updating process) to adapt to the environmental conditions which modify continuously.

Figure 3:
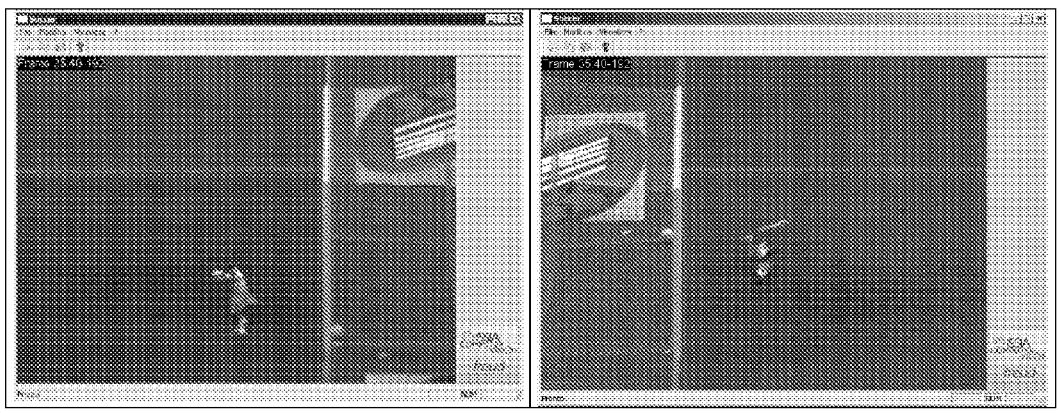
FIG. 3 illustrates a particular utilization mode of the system subject of the present invention.

With the system in the Live state (that is active recording and processing) it is possible activating simultaneously the Playback functionality, as illustrated by way of example in FIG. 3, for the objective check of the just recorded significant events with direct access to images in any moment of the game which is being recorded. The system automatically produces and keeps a list of events of possible interest which the user can display in playback mode. In particular, these events could be used and inspected for exclusively educational use by the same referees and assistants.

An Evolved Interface allows the quick access and the display of videoclips with different display modes (frame rate variable in combination with variable rallenty effect, fast forward, fast rewind, . . . ).

Additional functionalities of the system are available by means of the evolved interface in the post-match OFF-LINE state:

off-line Intelligent Playback, when the match is not being recorded, it is possible re-activating the processing processes for searching automatically the Goal-noGoal events;

Interactive display. By means of the navigation bar, the user can display and inspection any recording area. The access to the recorded images is direct and the simultaneous display of the 4 images (corresponding to the 4 cameras) is immediate by positioning the (recording) time bar in the wished point. Considering the huge volume of images (32,400,000 in 45 minutes) the evolved interface places at disposal a speed bar by allowing the user to move forward and backward in time in an efficient way starting from the displayed frame. In substance, it is possible to display the video sequences at different speeds (rallenty, Fast) and at a different sampling frequency by means of the delay bar cursor to simulate, for example, the vision of videoclips generated by standard cameras (25 frame/sec). A motion inverter key allows visualizing forwards/backwards a match area of interest. Particular events of a match can be inspected efficiently, in on-line or playback mode, by combining the actions of the delay bar cursor and of the motion inverter key;

Tuning processing parameters, the setting of the processing parameters (static and dynamic threshold of the background, background updating frequency, neural network, . . . ) can be modified by the user during the Live State and the Offline State. Display modes of the image sequences from the 4 cameras: not synchronized during recording, not synchronized during processing and synchronized in pairs of cameras related to each goal during processing;

Cameras' Calibration, in the offline state (no processing and recording in progress) it is possible aligning the cameras' asset with respect to the goals' sight. This functionality can take place automatically or manually by remotely controlling the Pan and Tilt motion. The optic and radiometric calibration is possible by remotely controlling the Zoom and Iris. The Iris' automatic control is implemented also in the Live state for the automatic control of the brightness conditions;

Various services (video clip extraction, Server activation and switching-off, . . . ), in the offline state a set of videoclips related to significant events, generated automatically by the system or selected by the operator, can be extracted automatically. Different modes of RAW image data formats (not compressed images), AVI with different compression modes chosen by the user (DivX, Mpeg2, Mpeg4, . . . ). Processing units for displaying RAW images are available with sophisticated mode for displaying videoclips with single and pair of images for each goal. At last, automatic procedures for switching on and switching off the whole system and the backup procedures for saving the match are available. The services for remotely accessing the whole Phantom Goal system by means of a (Pc Based) station, operating as front-end system, are also available.

Calibration of the Acquisition Optical Devices

The cameras' calibration is a delicate operation the correct implementation thereof influences directly and heavily the results of the whole goal detection system.

The cameras' calibration means which has been utilized provides two different use scenarios, depending upon the requested level of interaction with the user:

manual calibration: in this operating context the implemented system allows the user to act directly onto the controllers of the PanTiltZoom head by availing of suitable graphic-pictorial tools which facilitate the task thereof. The implemented software allows acting separately and independently on each one of the head freedom levels, thus allowing horizontal, vertical motions and forwards (tele) or backwards (wide) zoom. Such operations can be made continuously, that is by ordering the head a given motion until a new order, or step by step, by setting the pulse length in milliseconds, and then acting with single strokes, for greater precision. One proceeds analogously as far as the scene focussing is concerned. The exposure deserves to be discussed separately, which in any case is set automatically by means of a specific command and which influences the scene brightness. Practically, the system calibrates automatically, by verifying the information about brightness coming from the camera, by then providing to open or close the Iris if in the scene there is too few or too much light. The scene brightness can be further controlled (apart from the physical function of modifying the diaphragm) by adequately setting to software the integration time of the image digitalizing process during acquisition;

automatic calibration: all operations provided in the manual calibration and described previously can be wholly remitted to the system. In this case, the software extracts and uses some references in the scene, in particular the lines (horizontal references) of the goal area and the posts (vertical references) to set automatically in the correct position. Some mathematic operators are applied to the image acquired by the camera, which operators allow extracting the edges of the (known) objects existing in the scene and subsequently from such edges one tries to detect the horizontal and vertical structures by means of a Hough transform, well known in literature. In this way one succeeds to detect both the post and the line of the goal area and from this information, thanks to some references about the position of the same in the image set during the system installation, one succeeds to calibrate the cameras correctly.

Image processing flow (the nodes' software components)

On each one of the 4 nodes 3 operating steps are performed:
a step for detecting the motion;
a step for detecting the ball;
a step for tracking the ball.

In the motion detection step the acquired image is cleaned from all the static areas which surely do not include the ball.

In the step for the ball detection, the system initially learns to recognize the ball after a training preliminary phase during thereof several ball sight are observed under different points of view and lighting conditions. Subsequently, the capabilities of generalizing the learning algorithm allows the system to detect the ball even in image sequences which have not been seen before with high recognition percentage.

At last, in the ball tracking step the ball dynamic parameters (trajectory and speed) are determined which allow to accelerate the ball detection process and to obviate partial or temporary occlusions of the ball itself.

Figure 4:
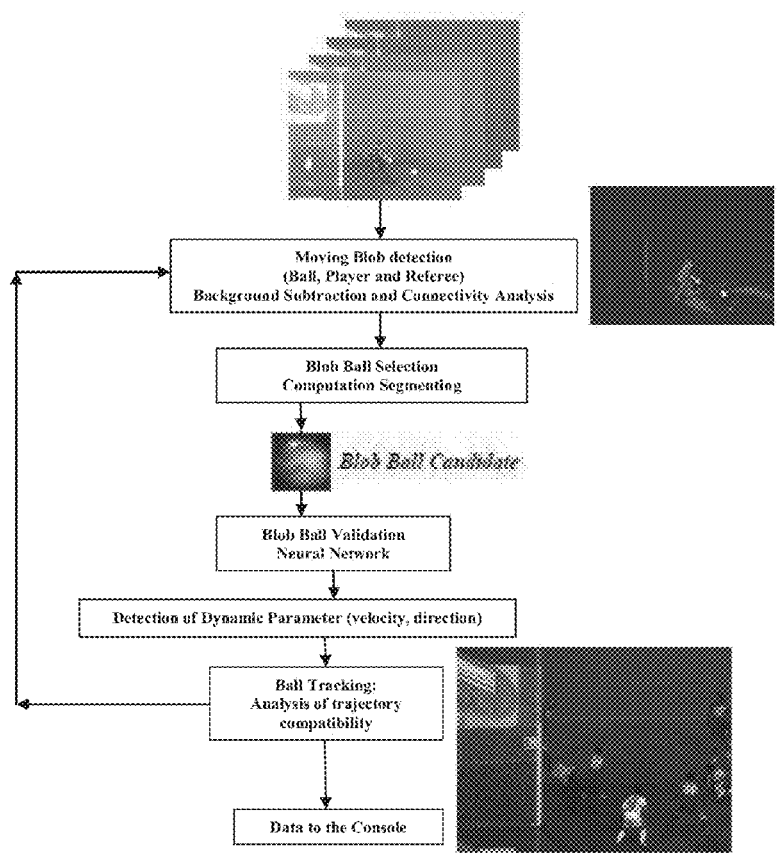
FIG. 4 shows a block diagram implementing the methodology subject of the present invention.

FIG. 4 shows the functional block diagram of the software for processing each node which, having as continuous input the image sequences at 200 fps related to their own goal, sends the data extracted to the supervisor which, after suitable processings, evaluates and signals automatically the Goal-noGoal event.

Detection of the Moving Areas

In order to optimize the ball search inside the acquired images, both in terms of computational times, both of real performances, one has thought advisable to introduce a preliminary processing phase directed at obtaining a filtered image wherein everything that is not the ball is eliminated.

In order to do this a motion detection algorithm based upon the background subtraction has been implemented, by means thereof the static areas are removed from the image, by liming all future operations to the dynamic areas only.

Figure 5:
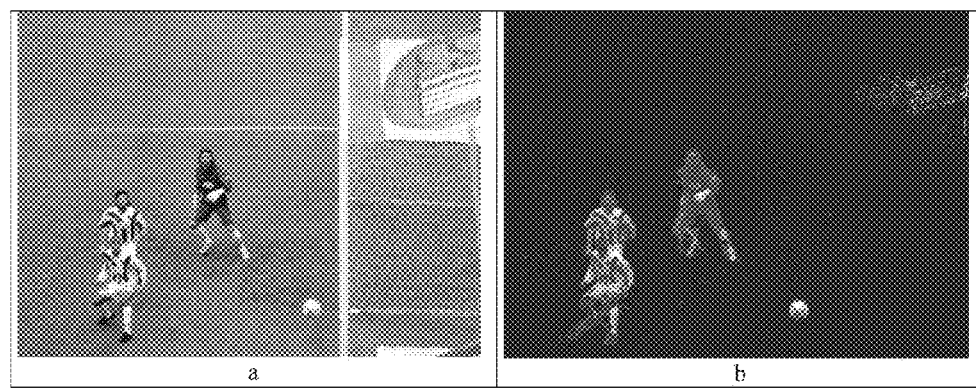
FIG. 5 represents by way of example a result obtained by using the methodology subject of the present invention.

FIG. 5 shows an image acquired during a match of series A of the Italian championship and the related image including only moving objects.

The background subtraction technique is based upon the use of a reference image (called indeed background image) which is compared pixel by pixel to the current image. From this comparison the differences between the two images emerge, that is the moving subjects, whereas the static objects are ignored.

Therefore, the output of such phase will be a "filtered" image including only the actually moving subjects (ball and players).

In order that such technique provides the best results, it is necessary giving particular attention to two main aspects: the phase of creating the background image and the phase of updating the image itself.

For the phase of creating the background image, a not supervisioned approach has been chosen based upon the calculation of the time average and the variance for each image pixel on a sequence of about 1000 frames (equivalent to an observation time of 5 seconds).

In this way the background construction can be efficiently completed even in presence of subjects moving inside the scene during the observation 5 seconds.

At the end of the observation period for each scene's pixel a pair of values is available corresponding to the average value and to the relative standard deviation which can be used as reference in order to determine the scene's static areas.

Practically one proceeds in constructing the difference image between the background image and the current image, obtained by putting to zero the pixels of the current image which do not belong to the probability distribution of the background pixels.

If the intensity value for the pixel (x,y) in the current image is designated with I(x,y) and, respectively, the average and the standard deviation for the same point with B(x,y) and S(x,y), then a point will be labelled as dynamic and it will assume a value equal to the one related to the current image if:

$$|I(x,y) - B(x,y)| > 2 * S(x,y)$$

that is if it differs from the value expected to be twice the standard deviation whereas it will be set to zero if such condition is not satisfied.

The reference model is constantly updated in order to avoid to degrade the segmentation result.

The frequency of such updating operation has to make the occurred variations to be included in the background image in the shortest possible time; however, it is also necessary to balance such updating speed to the need that the players and the ball itself be always visible, even when they stand in the same image area.

The detected compromise has been that of updating the image static areas (updated more quickly) and the dynamic areas (updated more slowly) with different weights. In this way, from what it has experimentally occurred on the field, the previously pointed-out needs are balanced ideally.

Formally the updating procedure is:

$$B^t(x, y) = \begin{cases} \alpha * B^{t-1}(x, y) + (1 - \alpha) * I^t(x, y) & I(x, y) \text{ static} \\ \beta * B^{t-1}(x, y) + (1 - \beta) * I^t(x, y) & I(x, y) \text{ dynamic} \end{cases}$$

wherein the parameters $\alpha$ and $\beta$ are used indeed to weigh in a different way the actual background value and the relative value in the current image. In our experiments the chosen values have been 0.5 for $\alpha$ and 0.95 for $\beta$.

Once detected the moving points existing in the scene a connectivity study is performed, in order to agglomerate adjacent pixel in areas (by consequently eliminating those incompatible with the ball sizes) and to eliminate from the scene the noise coming from the technological devices used for acquiring the images apart from the limits of the methodologies used for the processing thereof. Furthermore, in this phase additional pieces of information are calculated (area, coordinates of the center of gravity, width, height . . . ) for each one of the areas which will be then useful in the subsequent phases.

The implementation of an iterative algorithm which, starting from a pixel labelled as moving, examines all adjacent pixels and it marks them as belonging to a single object, underlies this delicate operation.

The base instructions of said iterative algorithm are shown hereinafter by way of example and not for limitative purpose:

```
1    Cycle onto the whole image I through the coordinates (x,y)
     {
2        If I(x,y) is a dynamic point
         {
3            if a pixel adjacent to (x,y) is dynamic and it has not yet
been examined
                 then, mark it as 'examined' and make it to become the
                 new (x,y)
                 return to 3
         }
         //I have finished to examine the points of a region
4    return to 1
}
//I have finished to examine all regions.
```

Ball Detection

Figure 6:
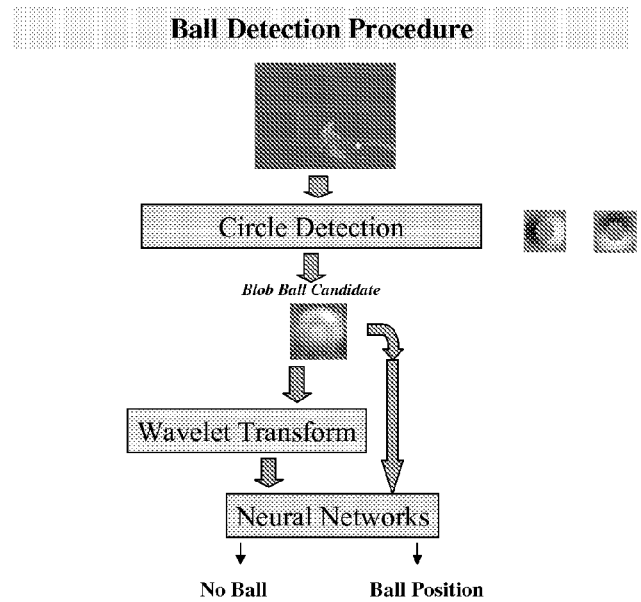
FIG. 6 illustrates by way of example and not for limitative purposes a block diagram implementing the methodology subject of the present invention.

By referring to FIG. 6, the functional scheme of the complex Ball Detection process is shown: in fact, the two phases for determining the ball are pointed out: in a first pre-processing phase, hereinafter designated with Shape Detection, based upon shape information, the probable regions containing the ball are detected, whereas in the second phase a classifier confirms or not the ball recognition (phase designated as Ball Recognition).

In the implemented system the Shape Detection phase is implemented by means of an operator who, by extracting the edges of the subjects existing in the current image, is able to look for not only the circumferences with fixed radius r but having radius in a given interval of the [Rmin,Rmax] type.

The operator can be defined as $$u(x, y) = \frac{\int\int_{D(x,y)} \vec{e}(\alpha, \beta) \cdot \vec{O}(\alpha - x, \beta - y) \, d\alpha \, d\beta}{2\pi(R_{max} - R_{min})} \quad (1)$$

Wherein the domain $D(x, y)$ is $$D(x, y) = \{(\alpha, \beta) \in \Re^2 \mid R_{min}^2 \le (\alpha - x)^2 + (\beta - y)^2 \le R_{max}^2\} \quad (2)$$

$\vec{e}$ the gradient versor $$\vec{e}(x, y) = \left[ \frac{E_x(x, y)}{|E|}, \frac{E_y(x, y)}{|E|} \right]^T \quad (3)$$

and $\vec{O}$ is the vector describing the kernel of the convolution containing a normalization factor, that is a filter apt to spatially characterize said moving subjects, in order to guarantee the search for all circumference in the fixed radius range [Rmin,Rmax].

$$\vec{o}(x, y) = \left[ \frac{\cos(\tan^{-1}(\frac{y}{x}))}{\sqrt{x^2 + y^2}}, \frac{\sin(\tan^{-1}(\frac{y}{x}))}{\sqrt{x^2 + y^2}} \right]^T \quad (4)$$

The use of the gradient versor has been introduced to obtain an operator the results thereof be independent from the contrast existing between the contour of the looked-for circumference and the background. This choice allows making the algorithm less sensible to the lighting conditions and to the acquisition conditions by allowing, then, a better adaptability thereof to the ball detection problem.

Figure 7:
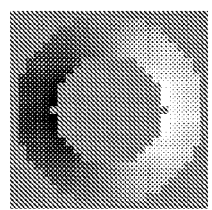
FIG. 7 illustrates a graphic detail of the methodology subject of the present invention.
Figure 7:
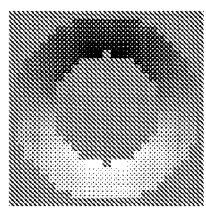

Such filter is represented by way of example and not for limitative purpose by the masks of FIG. 7, constituting the kernel vector for the x and y axis.

The size of the masks is (2·Rmax+1)×(2·Rmax+1) and substantially they represent in each point the direction of the radial vector scaled through the distance from the centre. The convolution between the images containing the edges of the objects in the scene and these masks allows evaluating how many image dots have the gradient direction concordant with the gradient direction of a set of circumferences represented by the masks.

The peak in the accumulation space represents the centre of the candidate area to contain the ball. The considerable advantage of this technique lies in the fact that it is possible looking for subjects with any shape by simply modifying the convolution masks. This is a considerable advantage if one considers what has been said relating to the impossibility for the ball to have a constant aspect.

The area detected by means of the just described technique is validated subsequently (Ball Recognition) by considering not only its shape but also other properties, first of all the weaving thereof.

In order to do this, one has chosen to utilize a supervisioned classifier to separate, based upon the features, the ball object from all other candidate objects of the preceding phases.

Generally the features of a pattern to be recognized in an image (independent from the classification method) can be represented in the space domain or in the frequency domain.

The classic representation in the space domain is the one directly provided by the grey levels acquired by the camera. For the representation in the frequency domain, instead, one can resort to suitable "transforms" like the wavelet transform which is an extension from the more known Fourier transform introduced by the French mathematician Jean Baptiste Joseph Fourier and which, contrary to the latter, allows keeping information also about the frequencies' space localization.

Generally, the representation of a pattern in the frequency domain is less sensible than the space one to the variations in the surrounding conditions (lightning, partial occlusions, small variations in shape or weaving) and therefore it allows reducing to the minimum the cases of not validation of the ball at candidates containing the ball or part thereof. However, this property in the wavelet representation determines some cases of wrong validation at not-ball objects, but which due to the shape, colour or weaving, in particular situations, are very similar to the ball itself.

In order to better exploit the frequency representation properties without introducing validation errors, one has thought to utilize both the space and the in-frequency representation.

As far as the supervisioned classifier is concerned, to be used to validate the areas extracted from the preceding phases based upon the wavelet coefficients or directly upon the space information, a neural artificial network has been chosen.

Practically, 2 different neural networks have been introduced, one trained by means of the wavelet coefficients and the other one trained by means of the space information (normalized between 0 and 1).

However, the introduction of only 2 neural networks is not sufficient to make the system be able to operate correctly under all conditions considering that the ball substantially modifies the appearance depending if the same is in any area of the field or in the goal area (therefore partially covered by the net). The lighting conditions of the shot area can further influence the classification.

In order to obviate such problem, a library of neural networks has been created wherein, for each specific lighting situation (for example, sunshine, darkness, cloudy), 4 different scenarios are considered:

1) outside the goal (wavelet)
2) outside the goal (space information)
3) in the goal (wavelet)
4) in the goal (space information)

For each instance of candidate extracted from the Hough transform, two networks are used and the pair choice depends upon the 2d position onto the image plane of the ball candidate (that is if it is on the right or on the left with respect to the post position defined during the camera's calibration) and upon the atmospherical conditions in the node's field of sight which in any moment can be set by the operator by means of the console.

Ball Tracking

The study of the ball dynamics is the third and last processing step introduced for strengthening the methodologies described for the ball detection and above all to speed-up the application thereof to make possible the processing of a huge number of images per second (real time processing), the latter requirement being unavoidable for a system for the detection of critical events in the football game.

The study of the ball dynamics is based upon the calculation of speed and trajectory onto the image plane, by means of a substantially predictive procedure.

In fact, the information about the motion speed and direction calculated at time t are used, together with the last known ball position, to predict the ball position at time t+1 (Tracking).

Practically, a relationship has been introduced for calculating the area of image acquired at time t+1 wherein the probability of finding the ball is maximum based upon the available information obtained by the preceding images.

The abscissa and ordinate of the point wherein, in the image acquired at time t+1, the search window is centered (equally to twice the ball radius) are given, respectively, by $$Px_{t+1} = Px_t + V_x e Py_{t+1} = Py_t + V_y.$$

The non detection of the ball in the area detected by predicting the motion thereof involves the progressive enlargement of the search area still centered in the point obtained by means of the shown formula.

In particular, the window is enlarged (as far as reaching the image borders) by extending the side of the square describing it by a value equal to the shifting between two consecutive frames of the ball travelling at the speed of 120 Km/h. Such shifting obviously depends upon the imaging system and therefore it can vary each time.

Obviously, when the prolonged non detection of the ball makes the search area be equal to the whole image, practically one returns to the condition wherein information about the scene dynamics are not available.

An additional advantage derived from knowing the ball motion information is to be able to evaluate each time (even based upon the goal distance) whether it is necessary to analyse all acquired frames or to sub-sample them in order to make the process faster.

This logic has been used then to avoid the analysis frame by frame in presence of slow balls, and far at least one meter from the goal, and it has allowed avoiding useless slowdowns of the system and consequently possible system congestion phases during thereof the detection of critical events could be strongly compromised. Furthermore, this solution has allowed the system to unlock the tracking in some sporadic cases wherein the ball detection algorithms respond positively at moving areas (short, T-shirts, etc.) assuming appearing features similar to the ball ones and which, from the static observation of the single patch, could be confused by the human eye too.

Integration of Data and Decision about Goal/No Goal—the Supervisor's Software (Console)

For each frame each one of the 4 nodes sends to the supervisor all pieces of information which it has succeeded to extract by means of a software processing unit of Ball detection and Ball Tracking.

Figure 8:
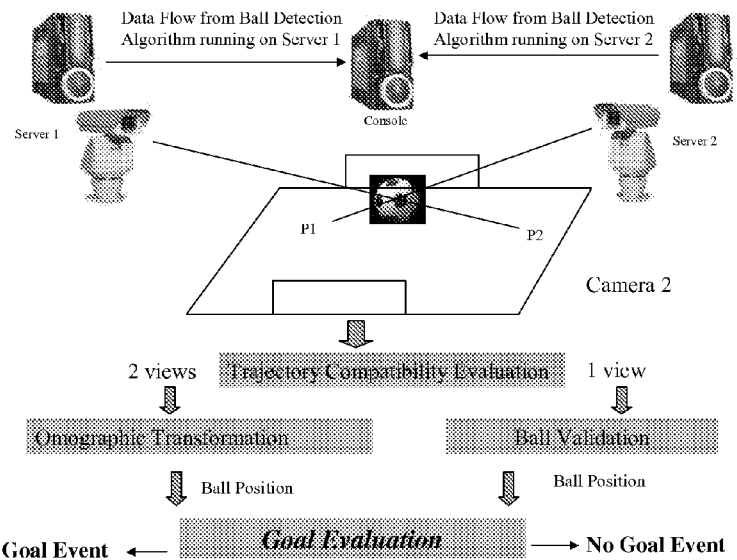
FIGS. 8 and 9 show by way of example a block diagram implementing the methodology subject of the present invention.

FIG. 8 shows, by way of example and not for limitative purpose, the system operating scheme for integrating and validating data with the purpose of the automatic detection of the goal event. The supervisor has the task of integrating and validating the information and, based upon the latter, it has to evaluate if the goal event has to be signalled or not.

Figure 9:
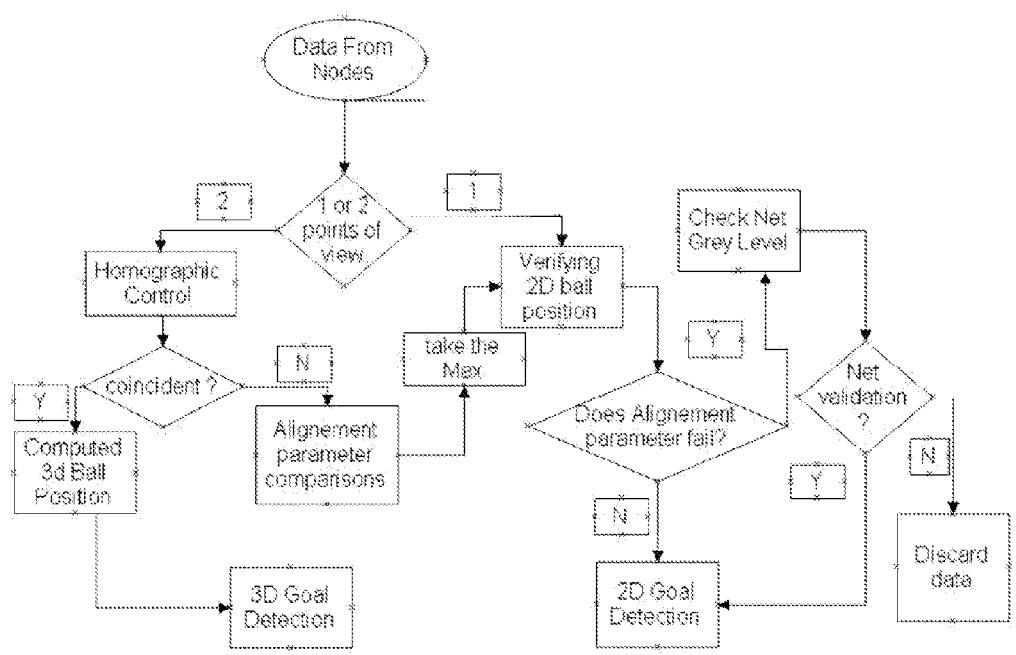

The logical scheme of the software processing units operating onto the console and of the interactions thereof is illustrated in FIG. 9 and it is described in details hereinafter.

When the console receives a data set related to a predetermined frame, first of all it verifies if the data set related to the analogous frame for the node coupled to the sender does exist in queue. In the affirmative case, one proceeds immediately with the processing of the data sent by the two nodes for the given frame. In the negative case, the frame processing at the console level is postponed and the data are put in queue therefrom they will be taken at time of the arrival of the lacking information or however after a predetermining waiting time. On the contrary, if the information about the same frame for the opposed camera could not arrive any more, given the processing sequentiality about nodes and the current processed frame (that is if the last frame processed by the opposed camera is greater than the expected frame), then one proceeds immediately with processing the data sent by the single node for the given frame.

Of course, depending upon whether the first or the second one of the two just-mentioned conditions occurs, different procedures for calculating and analyzing the events are activated.

In the first case, that is when there is information coming from both nodes of a pair, one proceeds with starting the ball localization procedure based upon homographic and 3d reconstruction techniques by means of stereo triangulation.

If all pieces of information about the ball position are coherent thereamong, the localization procedure allows detecting the 3D position of the ball mass centre with a quite low error margin.

Even if the homographic techniques are well known in literature, one thinks it is useful to provide some descriptions of the same, in order to better illustrate the geometrical principles whereupon the determination of said 3D position of the ball mass centre is based.

The homographic techniques are based upon the concept that some coplanar points therefor the position both in a starting space and in an arriving space (with the same size of the starting one) is known, then it is possible constructing a more or less complex transformation which allows to map all points in a space into the other one and viceversa.

In case of the implemented system, this property has been exploited by inserting a homography between two bidimensional spaces, that is between two planes. The first plane is constituted by the field of play, the second plane is constituted by the camera's image plane. As it will be seen in details, in order to construct a homographic transformation between these two planes it is necessary to know the related position of at least 4 points and subsequently it is possible to map each point of the image plane onto the field of play (viceversa is possible, but of low interest given the application).

This process repeates for all four cameras and, at last, from the analysis of the information obtained about the pairs of homologous cameras it is possible estimating the ball 3D position.

Theoretical Principles

The theoretical principles of the utilized homographic technique are described hereinafter.

Figure 10:
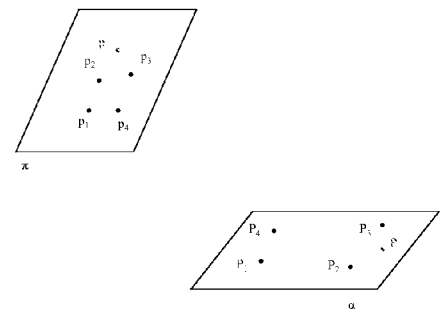
FIG. 10 illustrates a three-dimensional representation of a geometrical principle whereupon the methodology subject of the present invention is based.

By referring to FIG. 10, a generic dot of a plane α in space is designated with P and the projection thereof onto the image plane π is designated with p.

The mapping between these two planes is obtained by means of a homographic relationship of the following type:

$$P = Mp \quad (1)$$

wherein M is a matrix the sizes thereof depend upon the origin spaces of the two planes. It is to be noted that each dot p of the image plane is projected in the corresponding dot P of the plane α through M.

Such mapping can be determined through a homography with size 4×3.

In such case, the minimum number of dots P of the plane α, sufficient for calculating the dots mij of the matrix M is 4. In fact, a system of 11 equations in 11 unknown quantities is obtained (one is fixed in advance). Therefore, given 4 dots Pi on a plane in the space and the respective projections pi onto the image plane, it is possible calculating the homography M. Let's be for (i=1 ... 4)

($kx_i, ky_i, kz_i, k$) the homogeneous coordinates of the dots Pi of a plane α

($u_i, v_i, 1$) the homogeneous coordinates of the corresponding projections pi onto the image plane.

The (1) can be written again in the following way:

$$\begin{bmatrix} kx_i \\ ky_i \\ kz_i \\ k \end{bmatrix} = \begin{bmatrix} m_{11} & m_{11} & m_{13} \\ m_{21} & m_{22} & m_{23} \\ m_{31} & m_{32} & m_{33} \\ m_{41} & m_{42} & m_{33} \end{bmatrix} \begin{bmatrix} u_i \\ v_i \\ 1 \end{bmatrix} \quad (2)$$

the components to be determined are the 12 unknown quantities $m_{ij}$ of the matrix M. By replacing the k value extracted from the fourth equation in (2), given by $$k = m_{41}u_i + m_{42}v_i + m_{43},$$

in the first three equations, the following system is obtained:

$$\begin{cases} m_{41}u_i x_i + m_{42}u_i x_i + m_{43}x_i = m_{11}u_i + m_{12}v_i + m_{13} \\ m_{41}u_i y_i + m_{42}u_i y_i + m_{43}y_i = m_{21}u_i + m_{22}v_i + m_{23} \\ m_{41}u_i z_i + m_{42}u_i z_i + m_{43}z_i = m_{31}u_i + m_{32}v_i + m_{33} \end{cases} \quad (3)$$

By fixing $m_{43} = 1$:

$$\begin{cases} u_i m_{11} + v_i m_{12} + m_{13} - u_i x_i m_{41} - v_i x_i m_{42} = x_i \\ u_i m_{21} + v_i m_{22} + m_{23} - u_i y_i m_{41} - v_i y_i m_{42} = y_i \\ u_i m_{31} + v_i m_{32} + m_{33} - u_i z_i m_{41} - v_i z_i m_{42} = z_i \end{cases}$$

is obtained.

It results clear that each pair of dots (Pi,pi) produces three equations. Therefore, in order to determine the 11 components mij of the matrix M still unknown, at least four pairs of corresponding dots are necessary. The final not homogeneous linear equation system results to be the following:

$$\begin{bmatrix} u_1 & v_1 & 1 & 0 & 0 & 0 & 0 & 0 & 0 & -u_1 x_1 & -v_1 x_1 \\ 0 & 0 & 0 & u_1 & v_1 & 1 & 0 & 0 & 0 & -u_1 y_1 & -v_1 y_1 \\ 0 & 0 & 0 & 0 & 0 & 0 & u_1 & v_1 & 1 & -u_1 z_1 & -u_1 z_1 \\ u_2 & v_2 & 1 & 0 & 0 & 0 & 0 & 0 & 0 & -u_2 x_2 & -v_2 x_2 \\ 0 & 0 & 0 & u_2 & v_2 & 1 & 0 & 0 & 0 & -u_2 y_2 & -v_2 y_2 \\ 0 & 0 & 0 & 0 & 0 & 0 & u_2 & v_2 & 1 & -u_2 z_2 & -v_2 z_2 \\ u_3 & v_3 & 1 & 0 & 0 & 0 & 0 & 0 & 0 & -u_3 x_3 & -v_3 x_3 \\ 0 & 0 & 0 & u_3 & v_3 & 1 & 0 & 0 & 0 & -u_3 y_3 & -v_3 y_3 \\ 0 & 0 & 0 & 0 & 0 & 0 & u_3 & v_3 & 1 & -u_3 z_3 & -v_3 z_3 \\ u_4 & v_4 & 1 & 0 & 0 & 0 & 0 & 0 & 0 & -u_4 x_4 & -v_4 z_4 \\ 0 & 0 & 0 & u_4 & v_4 & 1 & 0 & 0 & 0 & -u_4 y_4 & -u_4 y_4 \end{bmatrix} \begin{bmatrix} m_{11} \\ m_{12} \\ m_{13} \\ m_{21} \\ m_{22} \\ m_{23} \\ m_{31} \\ m_{32} \\ m_{33} \\ m_{41} \\ m_{42} \end{bmatrix} = \begin{bmatrix} x_1 \\ y_1 \\ z_1 \\ x_2 \\ y_2 \\ z_2 \\ x_3 \\ y_3 \\ z_3 \\ x_4 \\ y_4 \end{bmatrix} \quad (4)$$

Once obtained the matrix M each other dot in the image plane π can be projected onto the plane α by applying simply the (1). It is to be noted that all three components (x,y,z) of the dots projected onto the plane α are determined univocally by the (3). It is to be noted that the components (x,y,z) are the real coordinates of the dots onto the plane α which can be in any position in the space.

Determination of the Ball 3D Position

Upon applying the technique described mathematically in the preceding paragraph to the two planes constituted by the field of play (plane α) and by the image plane (plane π) of the camera, it is then possible always determining the correspondence between the dots of one plane and those of the other one.

If the ball 3D position were always onto a plane, what said sofar would be enough to determine where is the ball in the scene starting from its position onto the image plane. Actually, the ball can be in any position of the 3D space and therefore, in order to determine its real position, an additional series of mathematic passages, based upon the combination of the information coming from the two cameras interested in the same field portion, is necessary to be introduced.

Practically, when the ball is in the scene for each one of the two homologous cameras therefor the matrix M of the homographic transformation has been determined, the straight line, intended as line of sight, is constructed, passing by the optical centre of the camera and by the point on the field of play determined thanks to the homographic transformation.

The intersection of the two so-constructed straight lines represents the ball 3D position. In order to show analytically said intersection, a reference system, for example, in the intersection point between the perpendicular to the ground by the camera 1 and the ground itself has to be fixed.

By using the transformation homographic matrixes M1 and M2, starting from the ball positions p1 and p2 onto the cameras' two image planes it is possible obtaining the coordinates onto the field of play of the corresponding points.

In fact there is:

$$P_1(x_1,y_1,0) = M1 p_1(u_1,v_1)$$

and $$P_2(x_2,y_2,0) = M2 p_2(u_2,v_2)$$

wherein $p_1(u_1,V_1)$ and $p_2(u_2,v_2)$ detect indeed the coordinates of the ball mass centre onto image planes of the 2 cameras.

By keeping into account that the optical centre of the camera 1 O1 will have coordinates (0,0,H1) whereas the optical centre O2 of camera 2 will have coordinates (X2,0,H2), the equations of the straight lines r1 and r2 passing by the points and the corresponding optical centres can be written as:

$$r_1: \frac{x-x_1}{0-x_1} = \frac{y-y_1}{0-y_1} = \frac{z-0}{H_1-0}$$

$$r_2: \frac{x-x_2}{X_2-x_2} = \frac{y-y_2}{0-y_2} = \frac{z-0}{H_2-0}.$$

Figure 11:
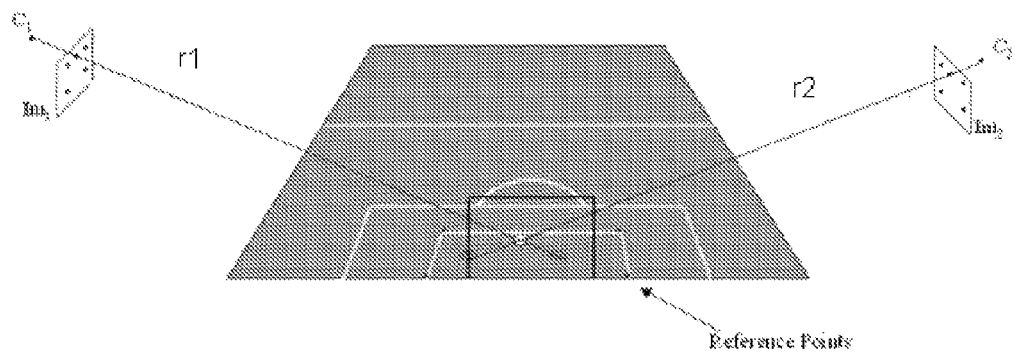
FIG. 11 illustrates a qualitative view of a practical application of a geometrical principle whereupon the methodology subject of the present invention is based.

At this point, by referring to FIG. 11, the ball 3D position can be obtained by the intersection of the straight lines r1 and r2.

If the information about the nodes is coherent, the supervisor activates a dedicated procedure which provides a control of the distance between the two straight lines joining the point detected onto the image plane as ball by the nodes and the same point projected onto the field of play by means of the linear homographic transformation introduced by the matrix M.

Ideally, the two subject straight lines should be incident, but actually, due to the measuring and approximation errors, they result to be always very near (with distances in the order of few centimetres) and the ball position is detected as the average point of the segment with minimum distance between the two straight lines. If this distance is high (more than 50 cm) it means that the data coming from the nodes do not refer to the same object of the scene and therefore it is necessary starting an alternative procedure for the data handling.

This procedure consists in evaluating in time the space trajectory of the two different objects detected by the two cameras and supposing that the interpretation of the camera tracking the object with a more linear trajectory be correct, by supposing in this way that not linear trajectories could be associated to false positives found by the nodes' ball detection algorithms.

If the information about one frame is available for one of the two pair nodes only (that is if the data of the other node have been discarded after the just described procedure based upon the control of the homographic coherence), the console cannot go back to the ball 3D position and consequently it cannot even validate the nodes' correct operation by means of the procedure described above.

In order to obviate the problem, in this case the console verifies the motion linearity onto the 2D plane of the object detected by the active camera and in case of unreliability due to not linear trajectories, it continues to consider the data as reliable only if they result to be certified as ball examples both by the neural network based upon the pre-processing wavelet and by the one based upon the direct analysis of the grey levels.

From what said sofar it, it results that depending upon the fact that coherent data are available or not from one or two views, it is necessary activating specific procedures (decision making) for detecting the goal event.

Figure 12:
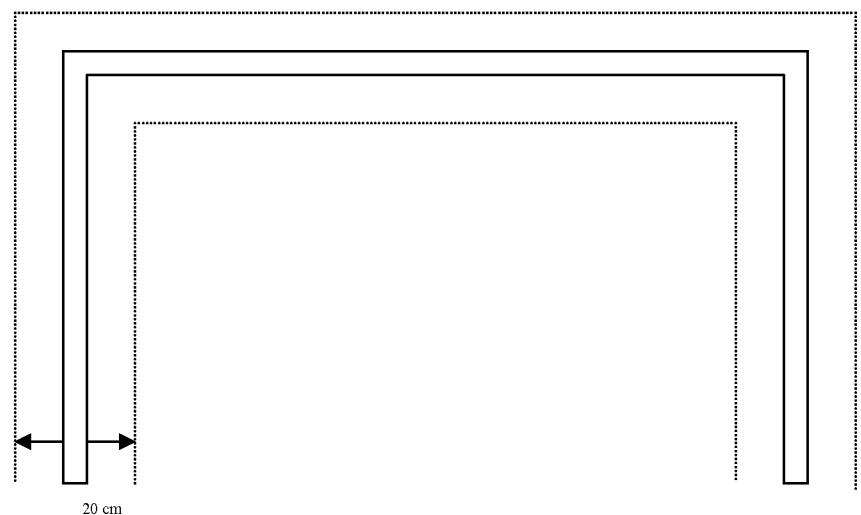
FIG. 12 shows a schematic vision of the accuracy of the methodology subject of the present invention.

In case the data coming from the two nodes are coherent, then the event detection is based upon the analysis of the ball 3D position. Since there is an error margin in estimating the 3D position, then the goal event is detected with certainty only if the ball position is inside the goal area with respect to the posts and to the transom by at least 20 cm. Practically, an uncertainty area is considered wherein the system alerts the user with a possible goal message. In FIG. 12 the uncertainty area around the goal is drawn with sketched lines.

It is to be noted that there are no uncertainty areas in the direction perpendicular to the goal plane, since the estimation of the ball position along that direction is sufficiently accurate as to consider the response of the homographic procedure always reliable.

If only the data related to one of the two cameras are available, the determination of the ball 3D reconstruction is not possible instead. In these cases the system alerts the operator when the ball (validated according to the procedure described before) exceeds the post in the camera's 2D image plane. Of course, one is brought back to this situation even in the cases wherein even having two views, one thereof is considered unreliable by the system. It is to be specified that in order to detect the goal, the fundamental metric measure is the ball distance from the vertical plane passing by the goal inner edge. Such 2D and 3D measure is always calculated by the system by generating an alert signal when the ball crosses fully the ball inner plane.

Operating Principles of the Nodes' Software

This paragraph has the purpose of illustrating with more details the logic therewith the processing units described in the preceding paragraphs interact and interface with the supervisor inside the whole system.

As previously illustrated, the system has to acquire or process 200 frames per second in order to be able to determine highly dynamic events (it is reminded that the ball can move at very high speeds, even up to 120 Km/h).

Furthermore, it has to be considered that, in order to have a good space resolution, it is also necessary to use images with minimum sizes equal to 640*480 (0.3 Megapixels).

Starting from these operative considerations it is simple to demonstrate that in order to guarantee the processing of all acquired frames, it would be necessary that each node complete the processing of the single frame in the maximum period of time of 1/200=0.005 s.

Actually, the time for processing the single frame is not a determining parameter, but it depends upon several factors, first of all the number of moving pixels to be processed (for each pixel it is necessary to perform convolution and sum operations) and the presence or absence of previous information about the scene dynamics (if the ball position in the frame t and the speed and motion direction thereof are known, the search area in the frame t+1 can be reduced).

In order to handle the variations in the frame processing time, in each node a storage area (buffer) has been introduced. Practically, the system accumulates the images acquired in this area and it processes the content thereof sequentially. Of course, the buffer has a limited capacity and therefore, in order to avoid that the queues exceed the size thereof, some operating principles and specific management and recovering procedures, allowing to the system to handle any situation, have been introduced.

Such operating principles and procedures, even if they do no compromise the performances for detecting the goal event, allows reducing the computational load without resorting to the use of specialized hardware which inevitably would involve an increase in the system costs.

First of all, one has thought to avoid the continuous processing of all acquired frames: by taking into consideration the cameras' restricted field of sight (about 2 meters before the goal line and one meter after in width and a little more than the goal area in height), it has been exploited the fact that for the most part of the time the image does not include the ball in order to utilize a jump mechanism (from now on 'Jump') inside the sequences acquired thanks thereof the calculation system succeeds in handling the buffer correctly.

Practically, under normal conditions only 1 every 20 acquired images is processed by the system (Jump 20), whereas when in one thereof the ball presence is detected, one proceeds with analysing each frame (Jump 1), however starting from the frame subsequent to the one processed previously (Jump −19) with negative result in order to allow to lock the ball in the moment wherein it has appeared in the scene.

When the system proceeds with Jump 1 and it determines in three consequent frames the ball presence, the tracking procedure is activated which, as it has been seen, it consists in searching for the ball in the subsequent frame in the surrounding area of the position taken in the preceding frame. The surrounding area is assumed to be equal to the maximum distance which can be run by a ball travelling at 120 Km/h without considering the direction (if not for an initial search order) to avoid to loose the ball when it is deviated or rejected by a player or by the goal posts. This solution allows reducing the search time and making each subsequent detection to be compatible with the preceding ones. When one is in the tracking phase and in the following frames the ball is not detected anymore, the search surrounding area is enlarged step by step until covering the whole image and after a predetermined waiting time the status of Jump 20 is restored, since at this point it is assumed that the ball is out of the scene.

The status of Jump 20 is restored even when the ball is near the image edges and it is about to go out from the scene or when the calculated speed is very low (still ball and therefore scarce possibility of observing significant events) or the ball motion persists in a not linear course (typical of situations wherein objects similar to the ball have been erroneously recognized as ball by the system).

Another stratagem to allow processing time adequate to the buffer maximum size has been the one of introducing downwards the background subtraction process a procedure for analysing the connectivity which allows to label the motion areas and to eliminate upwards the ones incompatible with the ball sizes.

This procedure is always active when the system is in the status with jump=20, but is deactivated in all other cases in order to allow a better interpretation of the scene (for example the ball could be filtered by the procedure for analysing the connectivity when it is very near to a player or to a shadow thereof).

At last, as additional support for the sequences' real time processing one has decided to introduce a fourth step of sampling the sequences of acquired images (Jump=2) when during the tracking phase the ball is distant from the goal.

However, the possibility that the buffer fills up due to particular and unusual operating conditions cannot be excluded and therefore a specific handling procedure has been introduced allowing the system to restore in about 2 seconds the usual operative conditions of the involved node (Procedure for Recovering the Node Time Drift). Practically, for each acquired frame the node verifies the number of records occupied by the buffer and if such number results to be greater than 90% (that is the buffer is almost full) it starts a special procedure which limits the node software to the processing of the given frame until the control upon the buffer records returns a value equal to 10% of the total available space (the buffer has been almost emptied).

It is important to underline that during the recovery procedure of the Node Time Drift the images are always acquired and stored (no frame is lost). However, the processing is reduced to the essential in order to update only the reference model for the background subtraction. The other procedures are not activated and therefore in this situation the real time detection of a goal event is not possible. As soon as the procedure is ended, all software procedures are restored and they operate on the current frames. The previously partially processed frames will not be processed any more if not in a subsequent explicit request of off-line Intelligent Playback by the user.

Bonds and Features

1. Software reserve bonds and transparency about the operating modes of the system under the FIGC-FIFA total control. All hardware components, wiring and software of the Phantom Goal system are under the FIGC-FIFA total control since the system is integrated in the stadium's infrastructures, which cannot be accessed and controlled from outside. The interconnection among servers, cameras, the console and the various supporting devices is implemented by means of an ad-hoc network infrastructure, on optical fibres and copper wiring. The system cannot be remotely accessed and it can be used only by physically accessing the server room (Control room);
2. Use of not proprietary technologies and accessibility to the implemented algorithms and to the source code;
3. Not invasive technology for the players, referee and assistants and for the infrastructures (the field of play, the ball). The optical teledetection systems are placed onto the stadium's infrastructures and however well outside the field of play, without interfering with the game visibility from the stands;
4. No interference with the game progress. The referee is supported by the Phantom Goal technology to take the decision about the Goal-NoGoal event based upon the signalling arrived in real time compatible with the match dynamics;
5. 1-cm accuracy in determining the ball position with respect to the vertical plane passing by the goal inner plane;
6. High security and integrity. It is not possible in any way to alter the system operation and however any malfunction can be always checked upon objective evaluation of the acquired images by appointed subjects.
7. Operativeness under different atmospheric conditions. The system has been tested under different atmospheric conditions and it is underlined that the optical sensors are also sensible to an infrared spectral component which should keep sufficient the visibility conditions when they are already critical for the human beings;
8. High maintainability level. The system is open to the technological solutions proposed by different providers. All hardware components are standard. The patented "intelligent software" components are available also for the expoitment thereof in accordance to the rules in force at International level for the patent protection.

The System Architecture utilized to implement the calculation system subject of the present invention will be described hereinafter by way of example.

Figure 13:
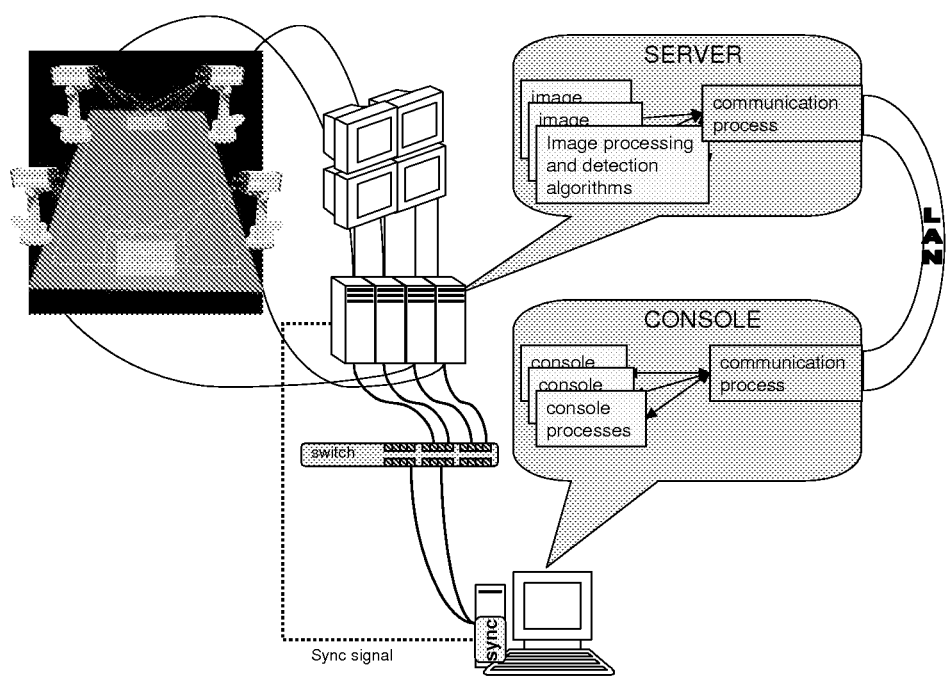
FIGS. 13 and 14 illustrate schematically and not with limitative purposes an example for connecting the various hardware components of the system subject of the present invention.
Figure 14:
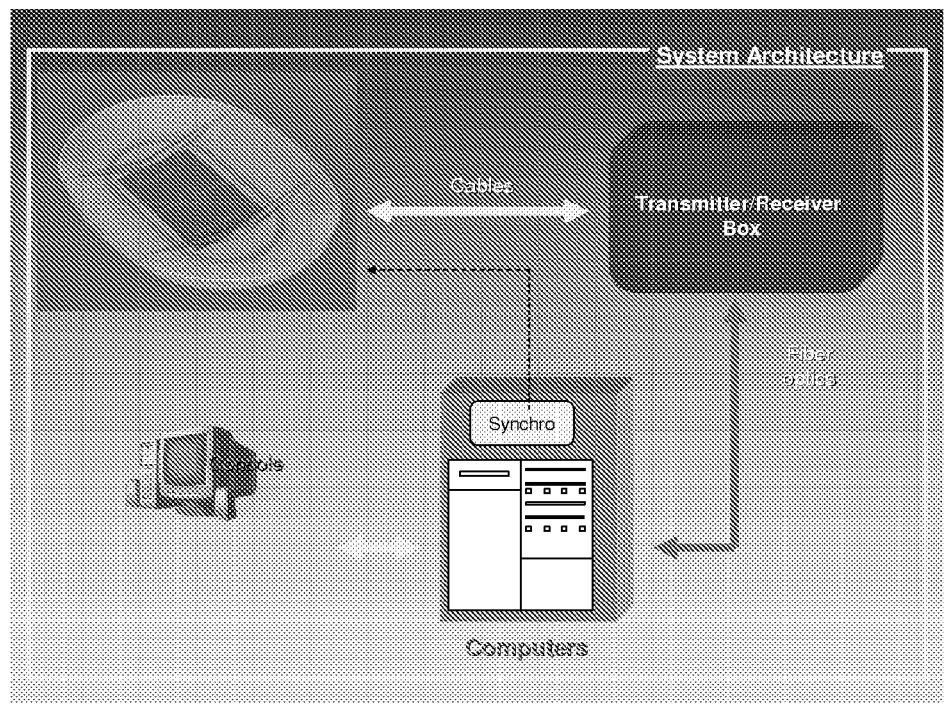

By referring to FIGS. 13 and 14, the systems for the Phantom Goal consists in hardware/software components in master/slave architecture composed as follows:

1. A Master unit, called console or supervision unit, which has the task of initializing all operations and handling the interaction between operator and all system's components;
2. Four twin slave units, called server or acquisition unit, which carry out the recording, display and processing of the acquired images.

The interaction between console and server takes place by means of connecting means, by way of example by means of a LAN (Local area network) and it is based upon a master-slave software strategy.

The Master Console

Figure 15:
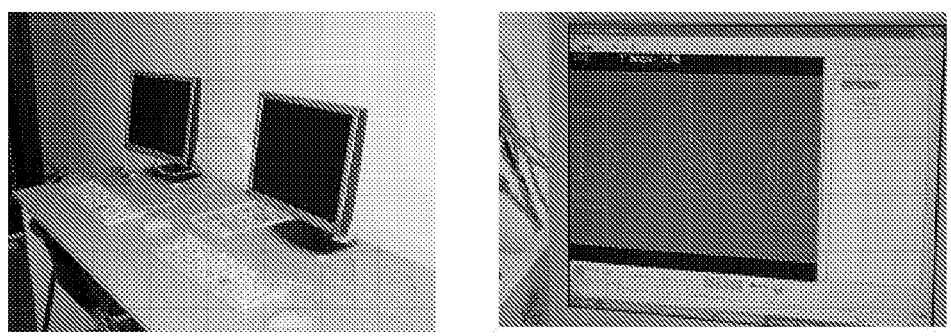
FIGS. 15 to 19 represent some hardware components composing the system subject of the present invention.

The console (FIG. 15) enables the servers to start the acquisition, recording and processing; it handles the goal events; it displays the images; it supervisions and integrates the processing results generated by the servers so as to take the correct decision. It is connected to the servers by means of a private LAN.

The console is based upon a user friendly software man—machine interface made up of five sections:

1. A Command section: which allows an operator to start the acquisition and recording of the acquired images, to enable the processing thereof so as to detect automatically the goal events; to extract videoclips of the significant events both in the standard and compressed format;
2. A Visualization section: by means of virtual keys similar to a videorecorder, it allows an operator to display the images recorded at different speeds: fast (for ex.: normal, 2×, 4×, etc.) or slowed down (for ex.: ½×, ¼×, etc.), for rewinding or forwarding the displayed sequence or for jumping to a specific time instant;
3. A Log section: All important events detected by the servers are communicated to the console. It provides to record them and to show them to the operator for a decisional validation;
4. A Tuning section: which allows modifying, even during the acquisition if necessary, some processing parameters used by the nodes, by choosing some pre-existing settings, based upon the atmospherical conditions observed during the match (for example: darkness, sun, cloudy rain);
5. A Watch section: which allows inspecting the intermediate result in the various processing phases of the images shot by each slave server (node).

Furthermore, the console handles the synchronization among the servers. In fact, it sends a trigger signal which is received at the same time by all servers to synchronize the acquisition.

Another task entrusted to the console is the integration of the replies coming from the slave servers.

The slave servers are logically treated in two distinct groups, wherein each group presides over the decisional processes of a particular goal and it is handled by a particular queue of the detections.

The synchronism obtained by means of the trigger allows assigning a frame number to the detections made simultaneously by the cameras in a particular time instant. The frame number is then used as key for sequencing the detections' queue.

The queue operation is based upon some assumptions:
Not all frames acquired by a node can be processed;
There is the possibility that a determined frame of a goal could be processed by zero, one or two nodes;
The processing order observed by each node during the "live" execution is strictly sequential;
The communications coming from the slave servers are received sequentially.

These bonds allow defining a behaviour in handling the queue able to postpone the processing of a frame until when the information of both views are not available or until when it cannot be deduced that, for a given frame, the pair information cannot be implemented any more.

The Slave servers

Each server carries out, autonomously, the image acquisition, the recording, the display and processing thereof and it communicates the results to the console. The servers are enabled directly by the master console and each one is made up of the following four logical units:

1. Acquisition Unit
2. Recording Unit
3. Display Unit
4. Processing Unit

Figure 16:
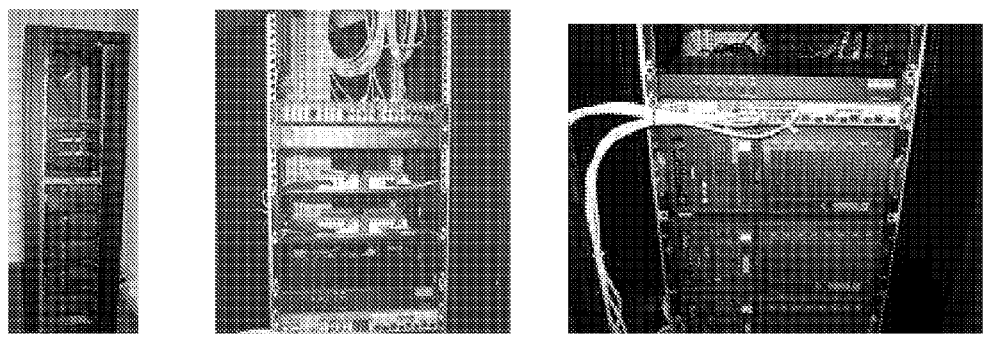

The hardware/software components of each sub-system will be described in details. FIG. 16 shows by way of example a detail of the hardware of the calculation architecture.

The Acquisition Sub-System

Figure 17:
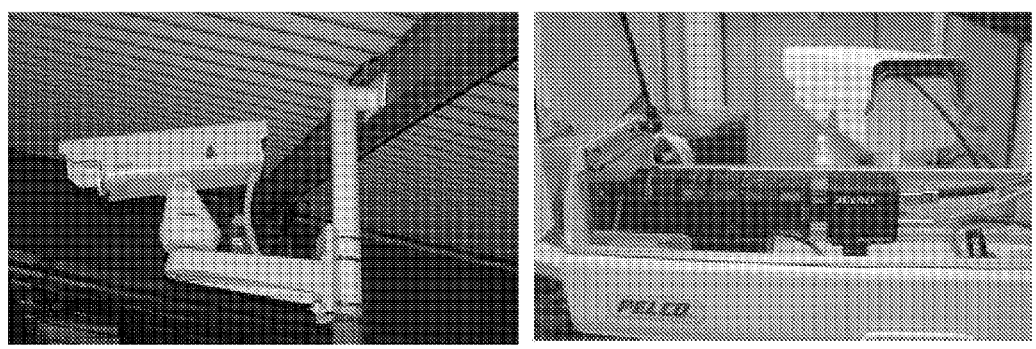

Each server handles the acquisition by a TV camera at 200 fps (frames per second). Each TV camera is installed in a IP66 casing as shown in FIG. 17. Each casing is equipped with a temperature-conditioning system so as to guarantee the correct environmental conditions for the operation of the TV camera and with a windscreen wiper. The conditioning system is operated automatically by means of two hot-cold calibrated temperature sensors. In case of temperature higher than 35° some fans are actuated; in case of lowering below 6° thermo-resistances are actuated.

The casing is assembled onto a pan-tilt unit so as to allow the correct alignment and calibration of the TV camera. The used optics is a 22× zoom. The pan-tilt unit, the windscreen wiper and the optics are remotely controlled by means of a control apparatus connected to the computer by a RS232 line.

The images acquired by the TV camera are in digital format and they are transmitted according to the CAMERALINK standard.

Figure 18:
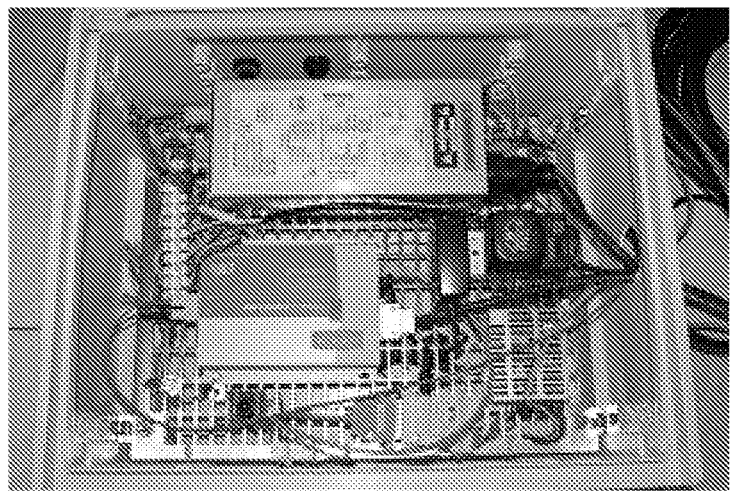

As the distance between the TV camera and the computer is greater than 200 mt, all electrical signals are converted by a specific converter into optical signals and sent on optical fibre as far as the computer. The control unit, the optical converter and the TV camera power supply are allocated in a IP66 casing represented in FIG. 18, installed near the TV camera.

At the computer station, a twin optical converter converts the optical signals into electrical signals which are sent directly to the computer. The imaging system installed in the computer is a digital grabber frame with a CAMERALINK interface to acquire the transmitted images. An acquisition programme, developed at CNR-ISSIA, makes the images available for the subsequent sub-systems (recording, display, etc.).

The Recording Unit

It consists of a software programme developed at CNR-ISSIA which records the images transmitted by the TV camera, at 200 fps, directly on SCSI disks. The sub-system storage capacity covers the whole football match, the extra times and the penalty kicks included.

The processing unit implements a system with direct access with disk with not buffered asynchronous mode able to operate in writing and to allow the contemporary reading in case of playback in the on-line operation. Proper protection and synchronization mechanism are implemented so as to guarantee the recording of all acquired frames.

The Display Unit

Figure 19:
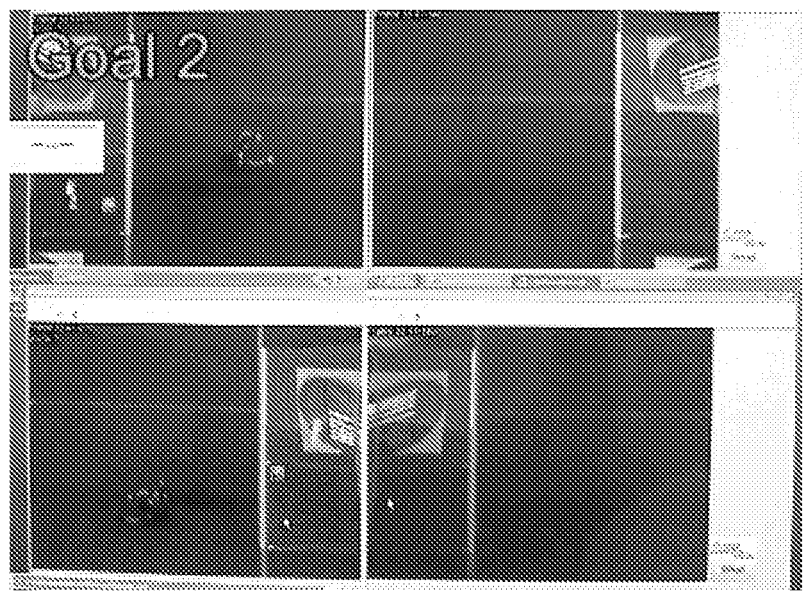

A software programme developed at CNR-ISSIA displays the images at a rate of 25 fps onto a monitor, by using the graphic capabilities of each server. FIG. 19 offers the view of the display outputs of all servers which are multiplexed by a video splitter onto a single 21"-LCD monitor. The display unit can display the images directly transmitted by the TV cameras (on-line mode) or those stored onto disks (playback mode).

The Processing unit

A software programmed developed at CNR-ISSIA implements the processing units for detecting the motion, for detecting the ball and for tracking the ball with an average processing speed of 200 fps, A buffer memory is interposed between the acquisition and processing units in order to allow possible fluctuation of images' processing times. Proper protection and synchronization mechanisms are implemented for a correct handling of such memory. The processing results are transmitted to the console without any delay or accumulation.

CONCLUSIONS

The present invention utilizes a not invasive technology both for the players and for the infrastructures concerning the field of play and without interfering with the International sporting rules in force and with the match managers, by observing also the bonds imposed by FIGC as far as the use of technologies not in a monopoly context is concerned.

CNR and FIGC have started the experimentation phase, made in a very reserved way, for the complete test of the system on official matches of series A without any impact or interference with the progress of the matches themselves.

The system was shown and approved by FIFA on 4 Mar. 2006 and FIFA itself in March 2007 will have to plan in which International show it will start the system's final experimentation.

The present invention has been described sofar with reference to preferred embodiments. It is to be meant that other embodiment belonging to the same inventive core may exist, all comprised within the protective scope of the herebelow reported claims.

The invention claimed is:

1. A method for evaluating an event occurrence in an area, said occurrence depending upon a mutual spatial position of at least one object with respect to a spatial position of one or more fixed references, the method comprising:
   a) acquiring a plurality of digital images in sequence in said area;
   b) for each acquired digital image of said plurality of digital images:
      defining a search region inside said acquired digital image;
      recognizing all moving objects in said acquired digital image;
      extracting from said acquired digital image a filtered image containing exclusively the moving objects;
      detecting in said search region of said filtered image the at least one object, the detecting comprising using an operator that includes a definition of a minimum and a maximum dimension associated with the at least one object;
      calculating the mutual spatial position based on the detecting of the at least one object;
      evaluating the event occurrence on the basis of the calculation; and
      providing an event occurence result on the basis of the evaluation,
   wherein said detecting is confirmed by a classifier based upon a neural network, said neural network being a) trained through wavelet coefficients and b) chosen from a library of neural networks.

2. The method according to claim 1, wherein said extracting a filtered image is carried out based upon a reference image.

3. The method according to claim 2, wherein said extracting a filtered image comprises comparing a current image to the reference image.

4. The method according to claim 2, wherein said reference image is updated over time.

5. The method according to claim 1, wherein said selecting comprises pre-processing each said acquired digital image.

6. The method according to claim 5, wherein said pre-processing comprises extracting edges of the moving objects in the image, by obtaining a bordered image.

7. The method according to claim 6, wherein said extracting the edges of the moving objects comprises constructing a correlation map by a convolution operation of the bordered image with a filter configured to characterize spatially said moving objects.

8. The method according to claim 7, wherein said filter comprises a bidimensional convolution mask.

9. The method according to claim 1, wherein said detecting further comprises calculating characteristic parameters of said moving objects.

10. The method according to claim 9, wherein said calculating is carried out by analysis of grey levels.

11. The method according to claim 9, wherein said calculating is carried out by a wavelet transformation.

12. The method according to claim 1, wherein said neural network is trained by spatial information.

13. The method according to claim 12, wherein said spatial information is obtained based upon analysis of grey levels of each acquired digital image.

14. The method according to claim 1, wherein said classifier is constructed through training steps with examples.

15. The method according to claim 1, wherein said calculating is based upon a predictive procedure.

16. The method according to claim 1, wherein said calculating the spatial position of the at least one object comprises measuring a three-dimensional position of a center of mass.

17. The method according to claim 16, wherein said measuring comprises calculating an intersection point of lines of sight generated by two observation points, 18. The method according to claim 17, wherein the lines of sight are constructed by way of homographic techniques.

19. The method according to claim 1, wherein said evaluating the event occurrence is based upon estimation of a bidimensional position inside an image plane.

20. The method according to claim 1, wherein said evaluating the event occurrence occurs in accordance to a metric decisional system.

21. The method according to claim 1, comprising storing each said acquired image.

22. A computer program, stored in a non-transitory storage means, said computer program configured to implement the method according to claim 1 when run on a computer.

23. The method according to claim 1, wherein said minimum and maximum dimension is based on at least a portion of a contour of said at least one object.

24. The method according to claim 23, wherein a) said at least one object is a ball, b) said at least a portion of the contour is a circular contour of said ball, and c) said minimum and maximum dimension is defined on the basis of said circular contour.

25. The method according to claim 1, wherein: a) said at least one object is a ball, b) said one or more fixed references is at least a portion of a goal line, and c) said event occurrence result is a Goal/NoGoal result.

26. The method according to claim 25, wherein said minimum and maximum dimension is a minimum and maximum radius of said ball.

27. The method according to claim 1, wherein said operator further comprises a gradient versor and a vector that describes a kernel of a convolution containing a normalization factor.

28. The method according to claim 1, wherein said gradient versor is operative to providing the event occurrence result independent of a contrast existing between a contour of the at least one object and a background in said acquired digital image.

29. The method according to claim 1, wherein said operator is defined as $$u(x, y) = \frac{\iint_{D(x,y)} \vec{e}(\alpha, \beta) \cdot \vec{O}(\alpha - x, \beta - y) d\alpha d\beta}{2\pi(R_{max} - R_{min})}$$

wherein said maximum dimension is $R_{max}$, said minimum dimension is $R_{min}$, $D(x,y)$ is a domain, $\vec{e}$ is a gradient versor, $\alpha$ and $\beta$ are weight parameters, and $\vec{O}$ is a vector that describes a kernel of a convolution containing a normalization factor.

30. A method for evaluating an event occurrence in an area, said occurrence depending upon a mutual spatial position of one or more moving subjects belonging to a predefined typology with respect to a spatial position of one or more fixed references, the method comprising:
   a) acquiring a plurality of digital images in sequence in said area;
   b) for each acquired digital image of said plurality of digital images:
      defining, a search region inside said acquired digital image;
      recognizing all moving subjects in said acquired digital image;
      extracting from said acquired digital image a filtered image containing exclusively the moving subjects;
      detecting in said search region of said filtered image, the moving subjects belonging to said predefined typology, the detecting carried out by a classifier that is based upon a neural network trained through wavelet coefficients, the neural network chosen from a library of neural networks according to spatial position of the moving subjects and visibility conditions;
      calculating the mutual spatial position from the detected moving subjects;
      evaluating the event occurrence; and
      signaling one of a first result or a second result on the basis of the evaluating.

31. A system for detecting and signaling an event occurrence in an area, said occurrence depending upon mutual spatial position of one or more moving subjects belonging to a predefined typology with respect to a spatial position of one or more fixed references, said system comprising:
   one or more acquisition units of a plurality of digital images of said area, wherein each said one or more acquisition units comprises one or more processing units configured to define the spatial position of each said one or more moving subjects with respect to one or more fixed references and, for each acquired digital image of said plurality of digital images: i) define a search region inside said acquired digital image; ii) recognize all moving subjects in said acquired digital image; and iii) extract from said acquired digital image a filtered image containing exclusively the moving subjects; and
   a supervision unit for evaluating said event occurrence based upon said mutual spatial position, the evaluating comprising the use of a detection function incorporating a minimum and a maximum dimension associated with at least one subject amongst the one or more moving subjects, wherein detecting through the detection function is confirmed by a classifier based upon a neural network, said neural network being a) trained through wavelet coefficients and b) chosen from a library of neural networks.

32. The system according to claim 31, wherein said acquisition unit comprises at least one camera.

33. The system according to claim 32, wherein said at least one camera is a digital camera operating at a time resolution of 200 images/sec.

34. The system according to claim 32, further comprising means for calibrating said at least one camera.

35. The system according to claim 31, wherein each said one or more acquisition units further comprises a unit for real time recording of the acquired digital images.

36. The system according to claim 31, further comprising means for connecting said one or more acquisition units to said supervision unit.

37. The system according to claim 31, wherein said supervision unit comprises man-machine interface means.

38. The system according to claim 37, wherein said interface means is configured to allow at least one of: a) analysis of said plurality of images, or b) display a result.

* * * * *

UNITED STATES PATENT AND TRADEMARK OFFICE
CERTIFICATE OF CORRECTION

PATENT NO. : 8,543,525 B2  Page 1 of 1
APPLICATION NO. : 12/280152
DATED : September 24, 2013
INVENTOR(S) : Distante et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1363 days.

Signed and Sealed this
Fifteenth Day of September, 2015

Michelle K. Lee
*Director of the United States Patent and Trademark Office*